M. A. KELLER.
SEPARATOR ATTACHMENT FOR THRASHING MACHINES.
No. 10,058. Reissued Mar. 7, 1882.
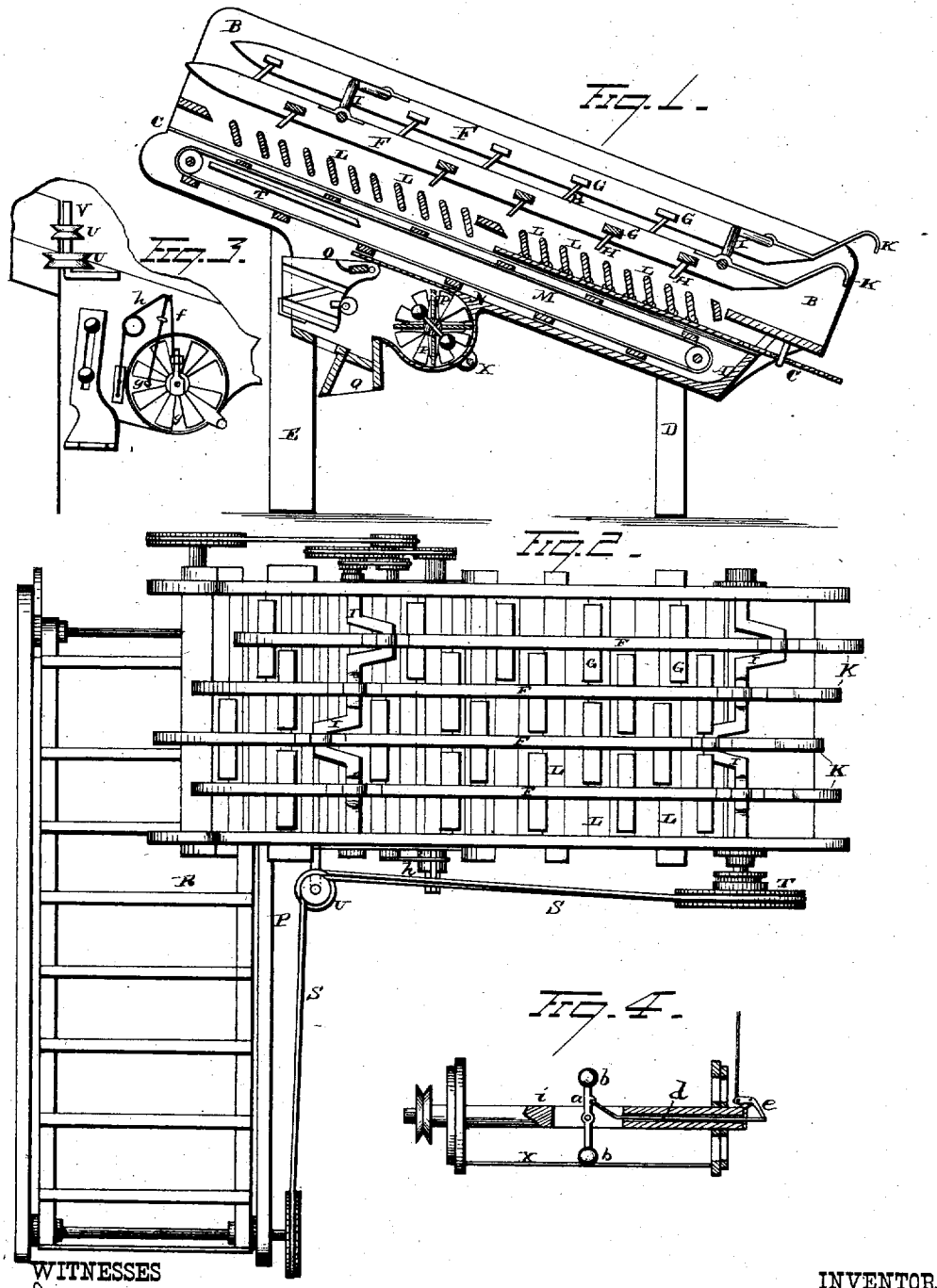
WITNESSES
Herman Moran.
A. M. Bright
INVENTOR
Moses A. Keller.
By H. A. Seymour.
ATTORNEY
N. PETERS, Photo-Lithographer, Washington, D. C.

UNITED STATES PATENT OFFICE.

MOSES A. KELLER, OF LITTLESTOWN, PENNSYLVANIA.

SEPARATOR ATTACHMENT FOR THRASHING-MACHINES.

SPECIFICATION forming part of Reissued Letters Patent No. 10,058, dated March 7, 1882.

Original No. 106,370, dated August 16, 1870. Application for reissue filed July 13, 1881.

*To all whom it may concern:*

Be it known that I, MOSES A. KELLER, of Littlestown, in the county of Adams and State of Pennsylvania, have invented a new and Improved Separator Attachment for Thrashing-Machines; and I do hereby declare that the following is a full, clear, and exact description thereof, which will enable others skilled in the art to make and use the same, reference being had to the accompanying drawings, forming a part of this specification.

My invention relates to an improvement in straw and grain separators; and the invention consists in certain features of construction and combinations of parts, as will hereinafter be described, and pointed out in the claims.

In the accompanying drawings, Figure 1 is a sectional elevation of my improved machine. Fig. 2 is a plan view. Fig. 3 is a partial side elevation, and Fig. 4 is a section of the fan-shaft and the air-regulating apparatus.

A and B represent an inclined case for the straw carrying and separating apparatus and the endless carrier, made in two parts connected together on the line C, so as to be readily separated. This case is supported on the short posts D at one end and long posts E at the other end.

F represents the long bars of the straw-carrier, to each of which is secured a series of short transverse bars, G, the latter being provided with fingers H. Bars F are mounted on the crank-shaft I, which are turned in the proper direction to cause the fingers H to engage with the straw and carry it from the lower end of the casing to its upper end. As the fingers are disengaged from the straw they are raised and moved rearwardly, and then descend and again engage with the straw. The lower or forward ends of the long bars of the straw-carrier are provided with hooks K, which take the straw as it is delivered from the thrashing-machine.

Below the straw-carriers are located the slats L, traversing the case and arranged on pivots to be turned for opening or closing the spaces to regulate the separation of the grain, chaff, and other short matter from the straw, which is carried upward from these slats. In thrashing oats, for instance, larger openings are required than for wheat or other grain smaller than oats. It is much more difficult to separate the small grain from the chaff than to separate oats therefrom. In thrashing wheat, should the openings between the slats be left the same as that required for oats, too much short straw would go with the chaff and wheat to the winnower, wheat-straw being much heavier than oat-straw; hence the necessity for adjusting the slats. The straw is delivered over the upper end of the case.

M is an endless grain-carrier, with cross-bars *m*, which travel in close proximity to the upper surface of the inclined bottom N of the case and serve to carry the grain and chaff up the incline bottom to the shaker O of the winnower, of which P represents the fan and Q the discharge-spout.

Within the endless carrier, and near its upper end, is placed a grain-board, T, upon which the grain and chaff fall from the upper portion of the machine and are delivered to the winnower.

R is another endless straw-carrier, supported on a frame, P, arranged for attachment, by means of hooks or otherwise, to the parts E, so as to receive the straw from the first carrier and convey it in a direction perpendicular thereto to a stack or mow. This carrier is worked by a belt, S, from the driving-wheel T of one of the crank-shafts of the first carrier, the said belts passing around pulley U, supported on a stud, V, in the angle between the case of the first carrier and this one, so as to rise or fall on the said stud, as may be required by the variations of the height of the end of the carrier R, to which the belt is connected.

The blast-regulator for the winnowers consists of a bar, *a*, pivoted at the center in a slot through the fan-shaft and provided with weights *b* at the ends, which, by the centrifugal force they acquire by motion, cause the bar to assume a line perpendicular to the shaft. This bar is connected by a rod, *d*, in the hollow fan-shaft to a bell-crank, *e*, mounted at the outer end of the fan-shaft and connected by a bent rod, *f*, with a register, *g*, fitted to the fan-shaft to turn thereon. A spring, *h*, is connected to this rod *f* and arranged to cause it to hold the register open; also to hold the bar *a* in an oblique position through the medium of the crank *e* and the rod *d*, so that when in motion the tendency of the bar to assume a line perpendicular to the shaft *i* of the fan will counteract the spring and move the register when the fan runs too fast, thereby reducing the force of the blast. The registers for each end of the fan-case are connected together by a bar, X, so that both will be worked by the one regulating apparatus.

Having fully described my invention, what I claim as new, and desire to secure by Letters Patent, is—

1. The combination, with a series of reciprocating straw-carriers and series of slats located beneath the straw-carriers and adapted to separate the straw from the grain and chaff, of an endless carrier provided with cross-bars, and a grain-board or inclined bottom placed below the carrier, whereby the grain and chaff fall between the cross-bars of the carrier onto the grain-board, and are then conveyed to the winnower, substantially as set forth.

2. The combination, with a reciprocating straw-carrier and a slatted separator, of an endless carrier located beneath the separator and grain-boards, one being located within the endless carrier near its upper end, and the other being located below the lower end of the carrier, substantially as set forth.

3. The combination, with the reciprocating straw-carrying bars F G, of the adjustable slats L, located beneath the straw-carrying bars and in close proximity thereto, substantially as set forth.

4. The combination, with the fan and fan-shaft, of the pivoted bar *a*, weights *b*, rod *d*, register *g*, and devices for connecting the rod *d* and register, substantially as set forth.

5. The combination, with the pulley for actuating the straw-carrier R and pulley T, of the belt S and guide-pulleys U, the latter supported on an elongated vertical stud, V, and adapted to be vertically adjustable thereon, substantially as set forth.

In testimony that I claim the foregoing I have hereunto set my hand this 30th day of April, 1881.

MOSES AARON KELLER.

Witnesses:
MORTON MINOT,
F. E. WILLIAMS.